United States Patent
Padua Oliveira et al.

(10) Patent No.: US 9,963,628 B2
(45) Date of Patent: May 8, 2018

(54) CURAUÁ FIBERS AS LOST-CIRCULATION MATERIALS AND FLUID-LOSS ADDITIVES IN WELLBORE FLUIDS

(71) Applicant: Halliburton Energy Services, Inc., Houston, TX (US)

(72) Inventors: Eliane Padua Oliveira, Niteroi (BR); Juan Pablo Luzardo, Rio de Janeiro (BR); Ioana Agustina Gianoglio Pantano, Rio de Janeiro (BR)

(73) Assignee: Halliburton Energy Services, Inc., Houston, TX (US)

( * ) Notice: Subject to any disclaimer, the term of this patent is extended or adjusted under 35 U.S.C. 154(b) by 0 days. days.

(21) Appl. No.: 15/114,332

(22) PCT Filed: Jul. 31, 2015

(86) PCT No.: PCT/US2015/043206
§ 371 (c)(1),
(2) Date: Jul. 26, 2016

(87) PCT Pub. No.: WO2016/028470
PCT Pub. Date: Feb. 25, 2016

(65) Prior Publication Data
US 2017/0240791 A1    Aug. 24, 2017

Related U.S. Application Data

(60) Provisional application No. 62/039,338, filed on Aug. 19, 2014.

(51) Int. Cl.
*C09K 8/20* (2006.01)
*C09K 8/60* (2006.01)
(Continued)

(52) U.S. Cl.
CPC ............. *C09K 8/32* (2013.01); *C09K 8/032* (2013.01); *C09K 8/035* (2013.01); *C09K 8/10* (2013.01);
(Continued)

(58) Field of Classification Search
CPC .......... C09K 8/32; C09K 8/032; C09K 8/035; C09K 8/10; C09K 2208/06
See application file for complete search history.

(56) References Cited

U.S. PATENT DOCUMENTS

| | | | |
|---|---|---|---|
| 6,016,879 | A | 1/2000 | Burts, Jr. |
| 2002/0010100 | A1 | 1/2002 | Wood |

(Continued)

OTHER PUBLICATIONS

Oliveira, Adriana Ferla de. Performance evaluation of lignocellulosic fibers in the sorption of diesel and biodiesel oils. 2010. xviii, 98 f. Thesis (doctorate)—Paulista State University, Faculty of Agronomic Sciences, 2010. (Year: 2010) Partial translation of relevant pages is attached.*

(Continued)

*Primary Examiner* — Aiqun Li
(74) *Attorney, Agent, or Firm* — McGuire Woods LLP

(57) ABSTRACT

A method and wellbore fluid using Curaua fiber to prevent or cure loss circulation during well operations. The wellbore fluid includes a base fluid and a plurality of Curaua fibers. The wellbore fluid may include concentration up to 120 lb/bbl Curaua fibers. The base fluid may include at least one of water-based fluid, brine-based fluid, oil-based fluid, synthetic-based fluid, or Pneumatic-drilling fluid system. The water-based fluids may further include at least one of seawater, brine, saturated brine, or formate brine. The water-based fluid may include a dispersed system. The water-based fluid may further include a non-dispersed system. The oil-based fluid may include at least one of diesel, mineral oil, and low-toxicity linear olefins and paraffins. The synthetic-
(Continued)

based fluid may include at least one of one of esters, internal olefins and linear paraffins. The oil-based and the synthetic-based fluids may further include lime.

10 Claims, 4 Drawing Sheets

(51) Int. Cl.
*C09K 8/32* (2006.01)
*C09K 8/035* (2006.01)
*C09K 8/03* (2006.01)
*C09K 8/10* (2006.01)
*E21B 33/138* (2006.01)
*E21B 21/00* (2006.01)

(52) U.S. Cl.
CPC .......... *E21B 21/003* (2013.01); *E21B 33/138* (2013.01); *C09K 2208/08* (2013.01)

(56) References Cited

U.S. PATENT DOCUMENTS

| | | | |
|---|---|---|---|
| 2002/0040812 A1 | 4/2002 | Heying | |
| 2003/0158045 A1* | 8/2003 | Jarrett | C09K 8/28 507/100 |
| 2012/0247763 A1 | 10/2012 | Rakitsky | |
| 2013/0041082 A1* | 2/2013 | Sunderland | B01F 17/0028 524/219 |
| 2014/0158354 A1 | 6/2014 | Kumar et al. | |
| 2015/0148476 A1* | 5/2015 | Thetford | C08G 69/48 524/570 |

OTHER PUBLICATIONS

International Search Report and Written Opinion dated Nov. 26, 2015; International PCT Application No. PCT/US2015/043206.

* cited by examiner

CURAUÁ FIBERS AS LOST-CIRCULATION MATERIALS AND FLUID-LOSS ADDITIVES IN WELLBORE FLUIDS

This application claims benefit and priority to U.S. Provisional Application No. 62/039,338 filed on Aug. 19, 2014, entitled: CURAUÁ FIBERS AS LOST-CIRCULATION MATERIALS AND FLUID-LOSS ADDITIVES IN WELLBORE FLUIDS, the disclosure of which is incorporated by reference herein in its entirety.

BACKGROUND

The present disclosure relates to method and wellbore fluid using Curauá fiber. More particularly, the present invention relates to methods of using the Curauá as part of wellbore fluids to prevent loss circulation during well operations.

During oil and gas operations, some or total loss of a wellbore fluid may undesirably flow into a subterranean formation. This is known as lost circulation or fluid loss. A lost-circulation material or fluid loss additive may be used to inhibit or prevent lost circulation into the formation.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

Figure 1A:
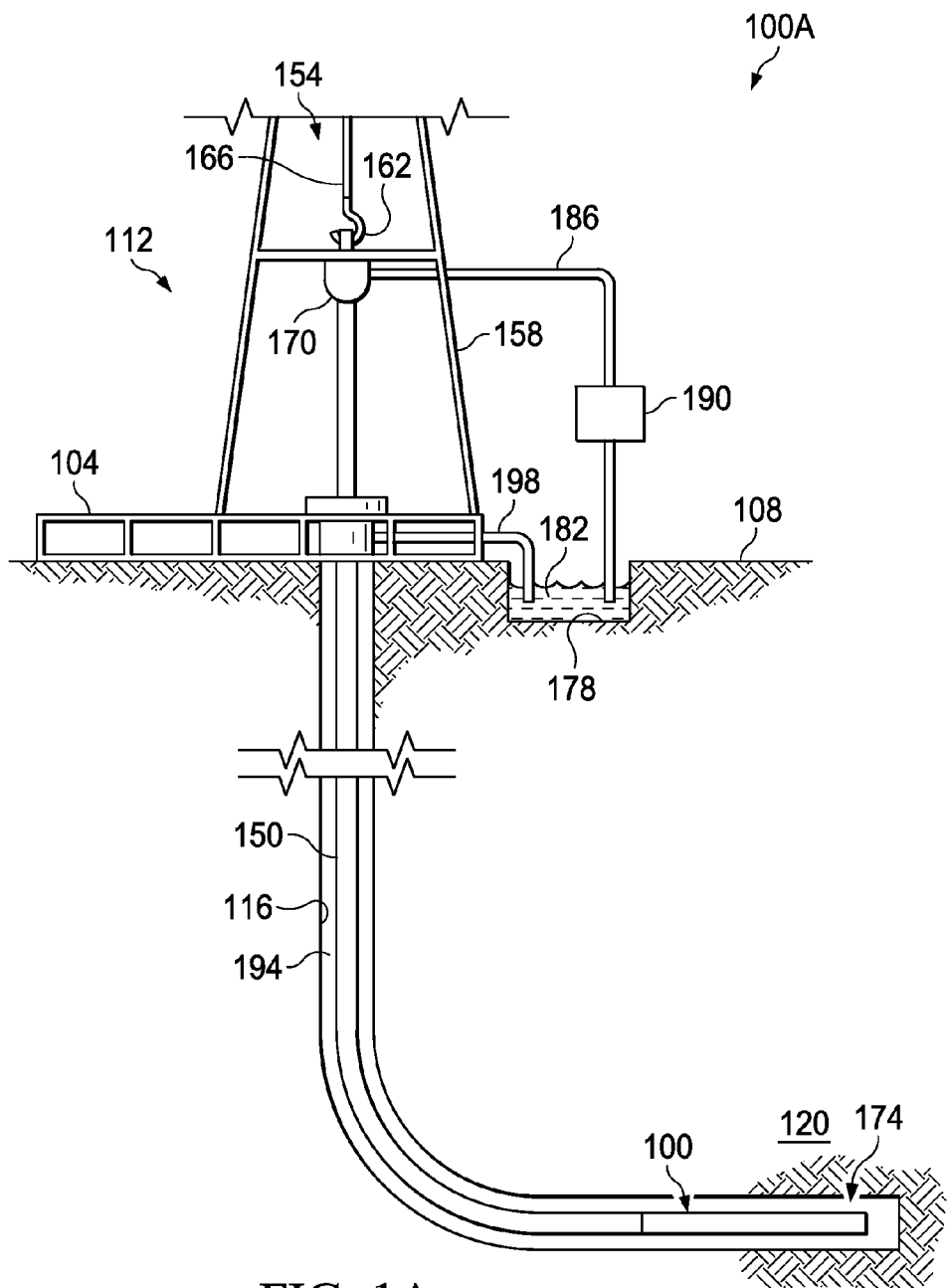
FIG. 1A illustrates a schematic view of an on-shore well using a wellbore fluid according to an illustrative embodiment.

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to". Unless otherwise indicated, as used throughout this document, "or" does not require mutual exclusivity.

As used herein, the phrases "hydraulically coupled," "hydraulically connected," "in hydraulic communication," "fluidly coupled," "fluidly connected," and "in fluid communication" refer to a form of coupling, connection, or communication related to fluids, and the corresponding flows or pressures associated with these fluids. In some embodiments, a hydraulic coupling, connection, or communication between two components describes components that are associated in such a way that fluid pressure may be transmitted between or among the components. Reference to a fluid coupling, connection, or communication between two components describes components that are associated in such a way that a fluid may flow between or among the components. Hydraulically coupled, connected, or communicating components may include certain arrangements where fluid does not flow between the components, but fluid pressure may nonetheless be transmitted such as via a diaphragm or piston.

As used herein, a "fluid" may include a substance having a continuous phase that tends to flow and to conform to the outline of its container when the substance is tested at a temperature of 71° F. (22° C.) and a pressure of one atmosphere "atm" (0.1 megapascals "MPa"). A fluid may be a liquid or gas. A homogenous fluid has only one phase; whereas, a heterogeneous fluid has more than one distinct phase. A heterogeneous fluid may be: a slurry, which includes a continuous liquid phase and undissolved solid particles as the dispersed phase; an emulsion, which includes a continuous liquid phase and at least one dispersed phase of immiscible liquid droplets; a foam, which includes a continuous liquid phase and a gas as the dispersed phase; or a mist, which includes a continuous gas phase and a liquid as the dispersed phase. A heterogeneous fluid will have only one continuous phase, but may have more than one dispersed phase. It is to be understood that any of the phases of a heterogeneous fluid (e.g., a continuous or dispersed phase) may contain dissolved or undissolved substances or compounds. As used herein, the phrase "base fluid" is the liquid that is in the greatest concentration in the wellbore fluid and is the solvent of a solution or the continuous phase of a heterogeneous fluid.

While a portion of a wellbore may in some instances be formed in a substantially vertical orientation, or relatively perpendicular to a surface of the well, the wellbore may in some instances be formed in a substantially horizontal orientation, or relatively parallel to the surface of the well, the wellbore may include portions that are partially vertical (or angled relative to substantially vertical) or partially horizontal (or angled relative to substantially horizontal).

The wellbore fluid and the method described herein assist in preventing fluid loss during well operations. The wellbore fluid includes a base fluid and a plurality of Curauá fibers. The composition may be introduced into a subterranean formation during well construction. The base fluid may include a wellbore fluid typically used in well construction process such as, for example, water-based fluids, brine-based fluids, oil-based fluids, synthetic-based fluids, Pneumatic-drilling fluid systems, and the like.

FIG. 1A illustrates a schematic view of a rig 104 operating an onshore drilling or production system 100A according to an illustrative embodiment. Rig 104 is positioned at a surface 108 of a well 112. The well 112 includes a wellbore 116 that extends from the surface 108 of the well 112 to a subterranean substrate or formation 120. The well 112 and rig 104 are illustrated onshore in FIG. 1A.

Figure 1B:
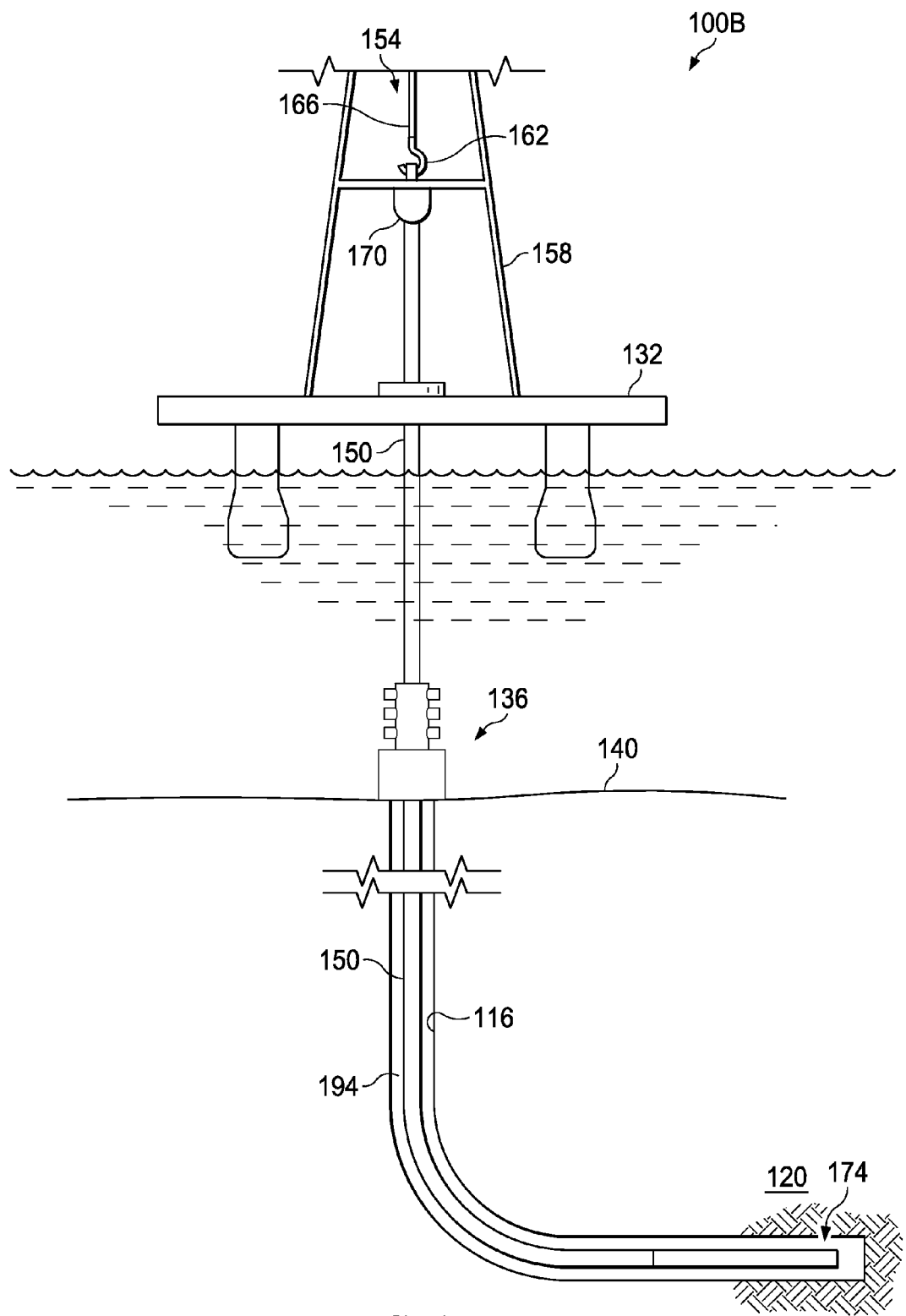
FIG. 1B illustrates a schematic view of an off-shore well using a wellbore fluid according to an illustrative embodiment.

Alternatively, FIG. 1B illustrates a schematic view of an off-shore platform 132 operating an offshore drilling or production system 100B according to an illustrative embodiment. The offshore drilling or production system 100B may be deployed in a sub-sea well 136 accessed by the offshore platform 132. The offshore platform 132 may be a floating on platform or may instead be anchored to a seabed 140.

FIGS. 1A and 1B each illustrate possible uses or deployments of a wellbore fluid according to principles of this disclosure, and while the following description of the systems 100A-B primarily focuses on the use of the systems 100A-B during the completion and production stages, the systems 100A-B also may be used in other stages of the well.

In the embodiments illustrated in FIGS. 1A and 1B, the wellbore 116 has been formed by a drilling process in which dirt, rock and other subterranean material is removed to create the wellbore 116. During or after the drilling process, a portion of the wellbore may be cased with a casing (not illustrated in FIGS. 1A and 1B). In other embodiments, the wellbore 116 may be maintained in an open-hole configuration without casing. The embodiments described herein are applicable to either cased or open-hole configurations of the wellbore 116.

After drilling of the wellbore 116 is complete and the associated drill bit and drill string are "tripped" from the wellbore 116, a work string or tubing string 150, which may eventually function as a production string, is lowered into the wellbore 116. The work string 150 may include sections of tubing, each of which are joined to adjacent tubing by threaded or other connection types. The work string may refer to the collection of pipes or tubes as a single component, or alternatively to the individual pipes or tubes that comprise the string. The term work string (or tubing string or production string) is not meant to be limiting in nature and may refer to any component or components that are capable of being coupled to the systems 100A-B to inject the wellbore fluid into the wellbore 116, or to provide energy to the systems 100A-B, such as that provided by fluids, electrical power or signals, or mechanical motion. Mechanical motion may involve rotationally or axially manipulating portions of the work string 150. In some embodiments, the work string 150 may include a passage disposed longitudinally in the work string 150 that is capable of allowing fluid communication between the surface 108 of the well 112 and a downhole location 174. The wellbore fluid may be injected into the well 112 via the passage.

The lowering of the work string 150 may be accomplished by a lift assembly 154 associated with a derrick 158 positioned on or adjacent to the rig 104, 132. The lift assembly 154 may include a hook 162, a cable 166, a traveling block (not shown), and a hoist (not shown) that cooperatively work together to lift or lower a swivel 170 that is coupled to an upper end of the work string 150. The work string 150 may be raised or lowered as needed to add additional sections of tubing to the work string 150 to position the systems 100A-B at the downhole location 174 in the wellbore 116.

A reservoir 178 may be positioned at the surface 108 to hold a fluid 182 (e.g., hydrocarbon, wellbore fluid, or the like) for delivery to the well 112 during setting of the systems 100A-B. A supply line 186 is fluidly coupled between the reservoir 178 and the passage of the work string 150. A pump 190 drives the fluid 182 through the supply line 186 and the work string 150 toward the downhole location 174. As described in more detail below, the fluid 182 may also be used to carry out debris from the wellbore prior to or during the completion process. After traveling downhole, the fluid 182 returns to the surface 108 by way of an annulus 194 between the work string 150 and the wellbore 116. At the surface 108, the fluid may be returned to the reservoir 178 through a return line 198. The fluid 178 may be filtered or otherwise processed prior to recirculation through the well 112.

Oil and gas hydrocarbons are naturally occurring in some subterranean formations. In the oil and gas industry, a subterranean formation containing oil or gas is referred to as a reservoir. A reservoir may be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from the wellbore is called a reservoir fluid.

A well may include, without limitation, an oil, gas, or water production well, a geothermal well, or an injection well. As used herein, a "well" includes at least one wellbore. The wellbore is drilled into a subterranean formation. The subterranean formation may be a part of a reservoir or adjacent to a reservoir. A wellbore may include vertical, inclined, and horizontal portions, and it may be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered the region within approximately 100 feet radially of the wellbore. As used herein, "into a well" means and includes into any portion of the well, including into the wellbore or into the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore, which may also contain a tubing string. A wellbore may contain an annulus. Examples of an annulus include, but are not limited to: the space between the wall of the wellbore and the outside of a tubing string in an open-hole wellbore; the space between the wall of the wellbore and the outside of a casing in a cased-hole wellbore; and the space between the inside of a casing and the outside of a tubing string in a cased-hole wellbore.

During well operations, a wellbore is formed using a drill bit. A drill string may be used to aid the drill bit in drilling through a subterranean formation to form the wellbore. The drill string may include a drilling pipe. A wellbore fluid adapted for this purpose is referred to as a drilling fluid or drilling mud, remediation fluid, and completion fluid. The wellbore fluid may be circulated downwardly through the drilling pipe, and back up the annulus between the wellbore and the outside of the drilling pipe. During wellbore operations, such as drilling or completion, some or all of the base fluid and the included heterogeneous materials of the wellbore fluid may undesirably flow into the subterranean formation instead of remaining in the wellbore and being circulated back up to the wellhead. This is known as lost circulation or fluid loss. Severe lost circulation may occur, in which greater than about 50 barrels of fluid is lost per hour. Severe lost circulation may occur, for example, when the dimensions of the highly-permeable area are large. For example, some fractures may have a larger opening compared to other fractures. Lesser losses may occur such as, for example, moderate and seepage losses.

In order to overcome the problems associated with lost circulation, lost-circulation materials ("LCM") or fluid-loss additives may be included in a wellbore fluid. LCMs may be swellable or non-swellable, granular-shaped or other geometric-shaped substances. As the wellbore fluid is placed into the well, the LCM may eliminate or lessen the amount of liquid or total fluid entering the subterranean formation. For example, the particles of the LCM may build upon each other and form a bridge over highly-permeable areas of the formation, such as natural fissures, fractures, and vugs, or induced fractures. The bridge may eliminate or reduce the amount of liquid base fluid entering the formation via the wellbore.

A wellbore fluid includes a base fluid and a plurality of Curauá fibers. The wellbore fluid may be introduced into a subterranean formation. The subterranean formation may be penetrated by a well. The wellbore fluid may be a variety of types of fluids used in oil or gas operations. As used herein, the term "fiber" means a solid that is characterized by having a high aspect ratio of length to diameter. For example, a fiber may have an aspect ratio of length to diameter from greater than about 2:1 to about 5,000:1. As used herein, the term "fibrillated fibers" and all grammatical variations thereof means fibers bearing sliver-like fibrils along the length of the fiber. The fibrils extend from the fiber, often referred to as the "core fiber," and have a diameter significantly less that the core fiber from which the fibrils extend.

The Curauá fibers may include particles either in their natural state, or modified by chemical/physical treatments. The Curauá fibers may be added as part of the system or separately in a smaller volume, in sufficient amounts to plug pores in subterranean formation, fractures, openings, and the like. More particularly, the use of sized Curauá fibers may be used for such purposes.

Figure 2:
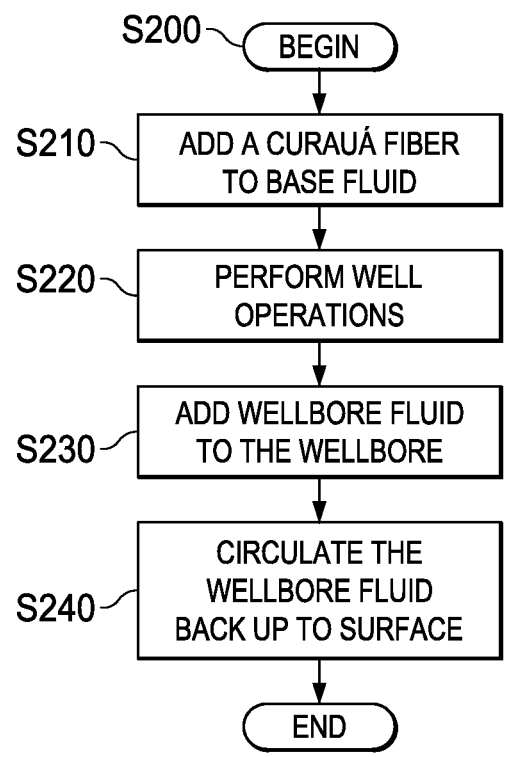
FIG. 2 illustrates an example of a method for using Curauá fiber as a wellbore fluid.

FIG. 2 shows an example of a method for using a wellbore fluid to prevent or cure lost circulation. The method may include adding a Curauá fiber to a base fluid to create a wellbore fluid (Step 210). The method may further include well operations such as, for example, wellbore drilling, and the like (Step 220). The Step 220 may occur prior to creating the wellbore fluid in Step 210. The drilling may include using a drill bit. The wellbore fluid then may be added to the wellbore (Step 230). Subsequently, the wellbore fluid may circulate back up to a surface (Step 240). The circulation may be induced or caused by a wellhead.

Figure 3:
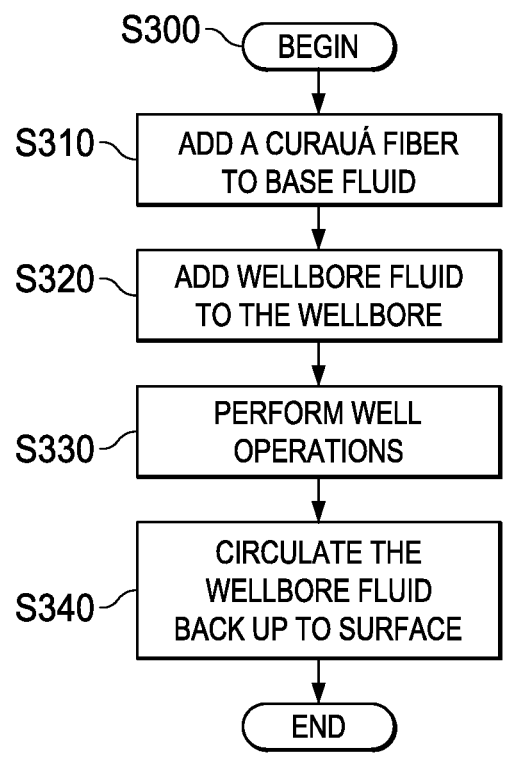
FIG. 3 illustrates yet another example of a method for using Curauá fiber as a wellbore fluid.

FIG. 3 shows an example of a method for using a wellbore fluid during well operations. The method may include adding a Curauá fiber to a base fluid to create a wellbore fluid (Step 310). The wellbore fluid may be added to the wellbore during wellbore operations (Step 320). The method may further include performing additional or continuous well operations (Step 330). This will help prevent wellbore fluid loss to the subterranean formations. The wellbore fluid may also be added to the wellbore before or after the well operations. Subsequently, the wellbore fluid may circulate back up to the surface (Step 340).

The Curauá fiber particles used as LCM generally are added to the wellbore fluid in a concentration up to 120 lb/bbl. Depending on the specific treatment such as, e.g., for seepage losses, Curauá fiber particles may be added in a concentration up to 25 lb/bbl. For partial losses, Curauá fiber particles may be added in a concentration range of 25-50 lb/bbl. For severe losses, Curauá fiber particles may be added in a concentration range of 35-70 lb/bbl. In extreme cases, Curauá fiber particles may be added in a concentration up to 120 lb/bbl. Concentrations of Curauá fiber particles above 40 lb/bbl may require special downhole tools (such as PBL) or pumped with open ended Drill Pipe.

Curauá fibers are extracted from the leaves of Curauá (*Ananas erectifolius*), a plant originally from the Brazilian Amazon, in the western region of Para State, North Brazil. Curauá is a monocotyledonous herbaceous species, belonging to the family Bromeliaceae. Advantages of this product is based on its low cost, it is non-toxic and biodegradable, obtained from renewable sources, recyclable, it has a low density; low attrition on processing equipment, and exhibits good mechanical properties. In addition, Curauá fibers have been used in other industries, such as the automobile sector, due to their high mechanical resistance compared to lignocellulose fibers.

The Curauá fibers may have a fiber length and diameter. The Curauá fibers may have a sized modal distribution of fiber lengths and/or diameters. The Curauá fibers may have a desired elastic modulus (G'), particle size distribution, and/or resiliency.

The Curauá fibers may include the following mechanical properties as outlined in below Table 1. The Curauá fibers may have a density of about 1.4 $g/cm^3$, and a tensile strength of about 283 to about 1150 Mp.

TABLE 1

| Fiber | Fiber type | Density ($g/cm^3$) | Tensile strength (Mpa) | Young's modulus (Gpa) | Specific strength ($Mpa/(g/cm^3)$) | Elongation at break (%) | Weibull modulus | Strain-to-failure (%) | Area ($mm^2$) |
|---|---|---|---|---|---|---|---|---|---|
| Curauá | Leave | 1.4 | 283-1150 | 11.8-96.2 | 360-820 | 3.7-4.3 | 2.22 | 0.8-3.9 | 0.004 ± 0.002 |

The wellbore fluid may include additional ingredients. The wellbore fluid may further include functions, such as, for example, control pressure (surge, swab, and circulating), support the wellbore, suspend solids, prevent damages to the formation and subterranean formation, and lubricate the drilling equipment, and the like.

The exemplary wellbore fluids and additives disclosed herein may directly or indirectly affect one or more components or pieces of equipment associated with the preparation, delivery, recapture, recycling, reuse, and/or disposal of the disclosed fluids and additives. For example, the disclosed fluids and additives may directly or indirectly affect one or more mixers, related mixing equipment, mud pits, storage facilities or units, fluid separators, heat exchangers, sensors, gauges, pumps, compressors, and the like used to generate, store, monitor, regulate, and/or recondition the exemplary fluids and additives. The disclosed fluids and additives may also directly or indirectly affect any transport or delivery equipment used to convey the fluids and additives to a well site or downhole such as, for example, any transport vessels, conduits, pipelines, trucks, tubulars, and/or pipes used to fluidically move the fluids and additives from one location to another, any pumps, compressors, or motors (e.g., topside or downhole) used to drive the fluids and additives into motion, any valves or related joints used to regulate the pressure or flow rate of the fluids, and any sensors (i.e., pressure and temperature), gauges, and/or combinations thereof, and the like. The disclosed fluids and additives may also directly or indirectly affect the various downhole equipment and tools that may come into contact with the fluids and additives such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

In an aspect of the present disclosure, a wellbore fluid using Curauá fiber for preventing fluid loss is disclosed. The wellbore fluid includes a base fluid and a plurality of Curauá fibers. The wellbore fluid may include a concentration up to 120 lb/bbl Curauá fibers. The base fluid may include at least one of water-based fluid, brine-based fluid, oil-based fluid, synthetic-based fluid, or Pneumatic-drilling fluid system.

The water-based fluids may include at least one of seawater, brine, saturated brine, or formate brine. The water-based fluid may include a dispersed system or a non-dispersed system.

The oil-based fluid may include at least one of diesel, mineral oil, and low-toxicity linear olefins and paraffins. The oil-based fluid may further include lime. The oil-based fluid may include a ratio of oil to water ratio in the range from 100 to 10.

The pneumatic-drilling fluid system may include at least one of air, gas, aerated fluid, and foam.

In another aspect of the present disclosure, a method for using wellbore fluid to prevent lost circulation is disclosed. The method includes providing a base fluid; adding a plurality of Curauá fibers to the base fluid to create a wellbore fluid; and constructing a wellbore using the wellbore fluid to prevent lost circulation.

In yet another aspect of the present disclosure, a method for using wellbore fluid to cure lost circulation is disclosed. The method includes providing a base fluid; adding a plurality of Curauá fibers to the base fluid to create a wellbore fluid; constructing a wellbore using the wellbore fluid to prevent lost circulation, and adding the wellbore fluid to the wellbore to cure lost circulation.

The wellbore fluid may further include a Curauá fibers concentration up to 120 lb/bbl.

The base fluid may include at least one of water-based fluid, brine-based fluid, oil-based fluid, synthetic-based fluid, or Pneumatic-drilling fluid system.

The water-based fluids may further include at least one of seawater, brine, saturated brine, or formate brine.

The oil-based fluid may include at least one of diesel, mineral oil, and low-toxicity linear olefins and paraffins.

The synthetic-based fluid may include at least one of esters, internal olefins, and linear paraffins.

The water-based fluid may include a dispersed system.

The oil-based and the synthetic-based fluids may further include lime.

The oil-based and the synthetic-based fluids may further include a ratio of oil or synthetic to water in the range from 100 to 10.

It should be apparent from the foregoing that embodiments of the invention having significant advantages have been provided. While the embodiments are shown in only a few forms, the embodiments are not limited but are susceptible to various changes and modifications without departing from the spirit thereof.

What is claimed is:

1. A wellbore fluid comprising: a base fluid comprising diesel and water: and a plurality of Curaua fibers, wherein the base fluid comprises a ratio of diesel to water in a range from 100 to 10, by volume.

2. The wellbore fluid according to claim 1 further comprising a concentration up to 120 lb/bbl Curauá fibers.

3. The wellbore fluid according to claim 1, wherein the oil based base fluid further comprises at least one of mineral oil and low-toxicity liner olefins and paraffins.

4. The wellbore fluid according to claim 1, wherein the base fluid further comprises lime.

5. The wellbore fluid of claim 1, wherein the plurality of Curauá fibers have a density of about 1.4 g/cm$^3$.

6. The wellbore fluid of claim 1, wherein the plurality of Curauá fibers have a tensile strength of about 283 Mp to about 1150 Mp.

7. The wellbore fluid of claim 1, wherein the plurality of Curauá fibers have a concentration of 25-50 lb/bbl.

8. The wellbore fluid of claim 1, wherein the plurality of Curauá fibers have a concentration of 35-70 lb/bbl.

9. The wellbore fluid of claim 1, wherein the plurality of Curauá fibers have a concentration of less than 25 lb/bbl.

10. The wellbore fluid of claim 1, wherein the plurality of Curauá fibers have a concentration of greater than 40 lb/bbl.

* * * * *